United States Patent
Igarashi et al.

(10) Patent No.: US 8,532,876 B2
(45) Date of Patent: Sep. 10, 2013

(54) VEHICLE STEERING CONTROL APPARATUS

(75) Inventors: Kazuhiro Igarashi, Sagamihara (JP); Tomoaki Oida, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 63 days.

(21) Appl. No.: 12/183,573

(22) Filed: Jul. 31, 2008

(65) Prior Publication Data

US 2009/0037054 A1 Feb. 5, 2009

(30) Foreign Application Priority Data

Aug. 2, 2007 (JP) ................................ 2007-201478
Apr. 14, 2008 (JP) ................................ 2008-104243

(51) Int. Cl.
*A01B 69/00* (2006.01)
*B62D 5/04* (2006.01)
*B62D 5/06* (2006.01)
*B60G 17/015* (2006.01)

(52) U.S. Cl.
USPC ............. 701/41; 180/446; 180/412; 280/5.51

(58) Field of Classification Search
USPC .............. 701/41–43, 36, 300, 301; 180/446, 180/443, 444, 78, 333, 400–428; 280/1.195, 280/1.202, 5.51, 234, 240, 263, 426, 442, 280/773–779; 74/480 R, 484 R, 473.31, 74/479.01
See application file for complete search history.

(56) References Cited

U.S. PATENT DOCUMENTS

| | | | |
|---|---|---|---|
| 7,065,436 B2 | 6/2006 | Hara | |
| 7,392,878 B2 | 7/2008 | Ono et al. | |
| 7,406,374 B2 | 7/2008 | Ono et al. | |
| 2003/0050748 A1* | 3/2003 | Iwazaki | 701/41 |
| 2005/0209752 A1 | 9/2005 | Ono et al. | |
| 2006/0006020 A1* | 1/2006 | Ono et al. | 180/446 |

FOREIGN PATENT DOCUMENTS

| | | |
|---|---|---|
| DE | 100 50 377 A1 | 4/2001 |
| EP | 1 621 448 A2 | 2/2006 |
| JP | 2001106107 A | 4/2001 |
| JP | 2003-175843 A | 6/2003 |
| JP | 2004-50853 A | 2/2004 |
| JP | 2005-170129 A | 6/2005 |
| JP | 2005-178575 A | 7/2005 |
| JP | 2005-263067 A | 9/2005 |
| JP | 2006-21562 A | 1/2006 |
| JP | 2006-199075 A | 8/2006 |
| JP | 2007-196833 * | 8/2007 |
| JP | 2007196833 * | 8/2007 |

\* cited by examiner

*Primary Examiner* — Muhammad Shafi

(74) *Attorney, Agent, or Firm* — Foley & Lardner LLP

(57) ABSTRACT

A vehicle steering control apparatus includes an actuator to vary a steering gear ratio of a vehicle wheel steer angle of a steerable wheel to a steering wheel angle. A controller controls the actuator to produce an actuator torque in a steering direction at a start of a driver's steering operation.

22 Claims, 12 Drawing Sheets

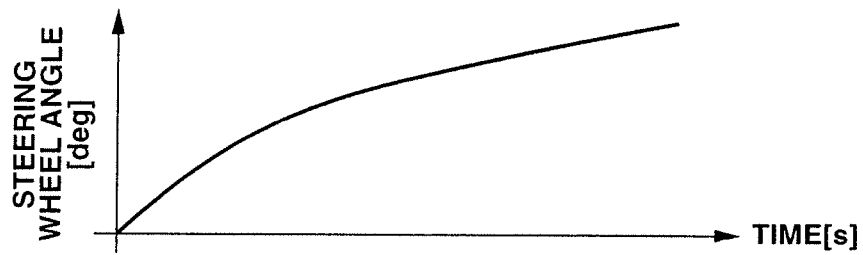
FIG.8A
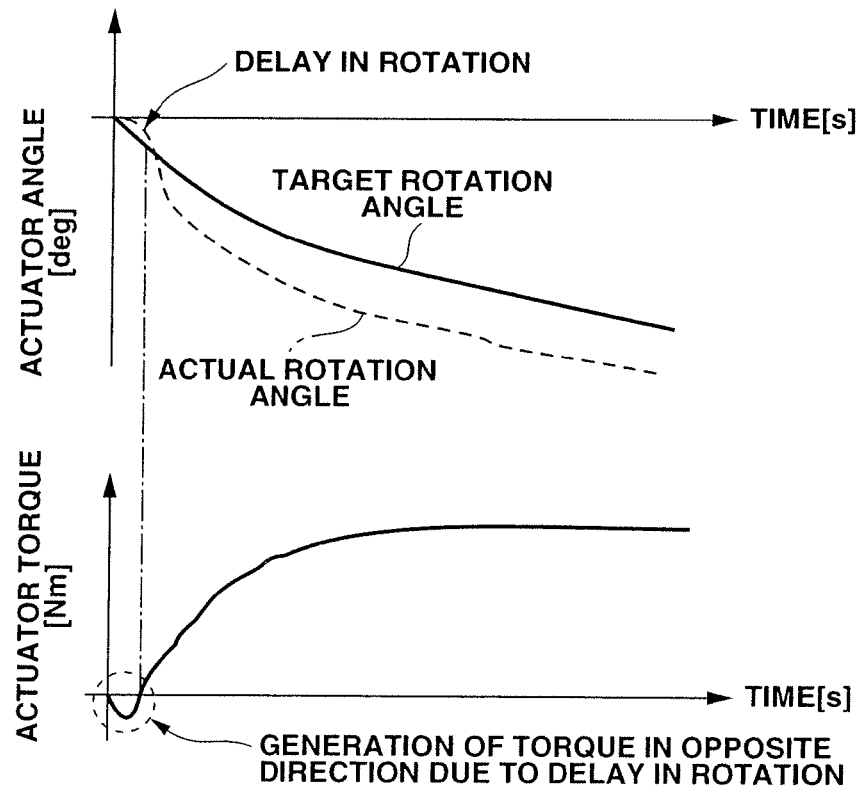
FIG.8B
FIG.8C
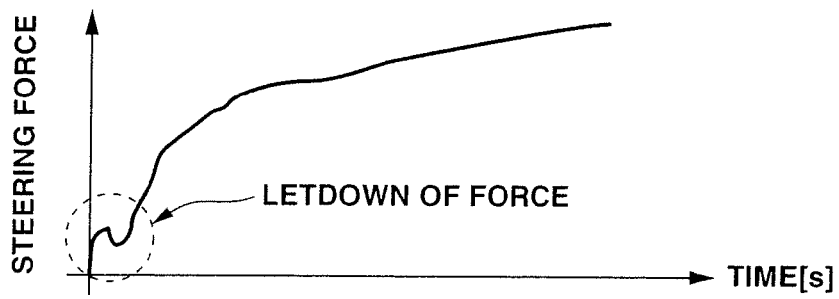
FIG.8D

VEHICLE STEERING CONTROL APPARATUS

BACKGROUND OF THE INVENTION

The present invention relates to vehicle steering control technique (apparatus and/or method) for varying a steering gear ratio of a steering wheel angle to a wheel steer angle of steerable wheel of a vehicle.

A published Japanese patent application, Publication No. JP2005-170129A shows a vehicle steering control system arranged to increase a servo gain of an angle inputting actuator in order to improve a steering stiffness in the vicinity of a steering neutral position where a deviation of an actual rotation angle from a target rotation angle of the actuator becomes smaller.

SUMMARY OF THE INVENTION

However, in an operation to set the steering gear ratio to a slow side by rotating the actuator (or a rotating element of the actuator) in the opposite direction opposite to the steering direction of the steering wheel, the actuator tends to produce an actuator torque in the opposite direction opposite to the steering direction at the start of a steering operation, and thereby provide the driver an unnatural feeling of decrease or letdown of the steering reaction.

Therefore, it is an object of the present invention to provide apparatus and/or method to prevent undesired decrease or letdown of the steering reaction at the start of a steering operation.

According to one aspect of the present invention, a vehicle steering control apparatus comprises: an actuator to vary a steering gear ratio of a vehicle wheel steer angle of a steerable wheel to a steering wheel angle; and a controller to control the actuator to produce an actuator torque in a steering direction at the start of a driver's steering operation.

According to another aspect of the invention, a vehicle steering control method comprises: a first method element of producing a control signal to control an actuator to vary a steering gear ratio of a vehicle wheel steer angle of a steerable wheel to a steering wheel angle; and modifying the control signal so as to prevent a torque from being produced by the actuator in an opposite direction opposite to a steering direction at the start of a driver's steering operation.

BRIEF DESCRIPTION OF THE DRAWINGS

FIG. 4 shows a state in which an actuator torque (motor torque) is produced in the same direction as a steering direction. FIG. 5 shows a state in which the actuator torque (motor torque) is produced in the direction opposite to the steering direction.

FIG. 8 (8A, 8B, 8C and 8D) is a time chart showing the operating conditions in the angle decreasing (subtracting) operation of the actuator.

DETAILED DESCRIPTION OF THE INVENTION

Figure 1:
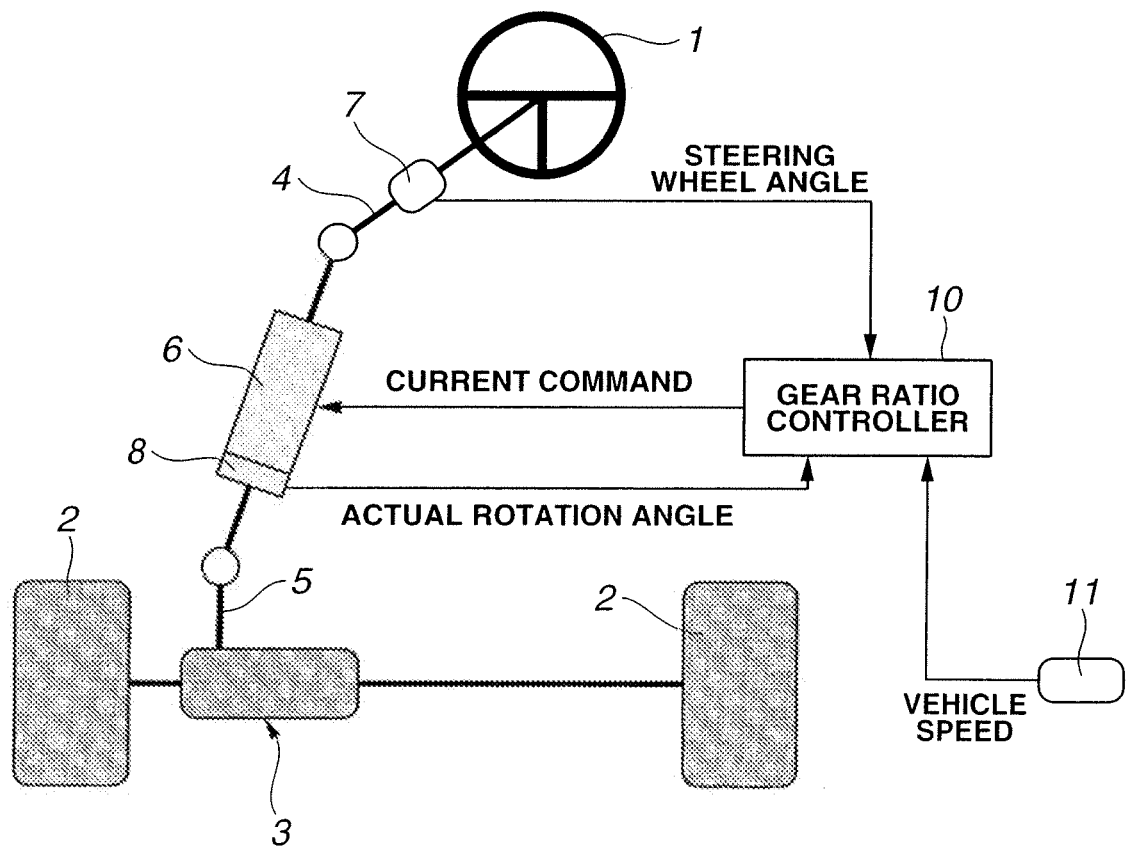
FIG. 1 is a schematic view showing a vehicle steering control system according to a first embodiment of the present invention.

FIG. 1 schematically shows a vehicle steering control apparatus or system according to a first embodiment of the present invention. A vehicle shown in FIG. 1 includes a steering wheel 1, front wheels (steerable wheels) 2 and a steering mechanism 3 which, in this example, includes a rack and pinion type steering gear for steering the front wheels 2. Steering wheel 1 is connected with steering mechanism 3 by a column shaft 4 and a pinion shaft 5. Column shaft 4 and pinion shaft 5 are connected through a gear ratio varying actuator or variable gear ratio actuator (angle inputting actuator) 6. In column shaft 4, there is provided a steering angle sensor 7 for sensing a rotation angle of column shaft 4 (steering wheel angle). Steering angle sensor 7 of this example uses a pulse encoder for sensing the steering angle. Gear ratio varying actuator 6 of this example includes a motor 20 (shown in FIG. 6). A sensor 8 is a motor rotation angle sensor for sensing a motor rotation angle of motor (or angle inputting motor) 20.

Gear ratio varying actuator 6 is an actuator to vary a steering gear ratio (also referred to as a gear ratio) which is a ratio of a rotation angle of pinion shaft 5 to a rotation angle of column shaft 4, or a ratio of the front wheel steer angle to the steering wheel angle. In this example, gear ratio varying actuator 6 is an actuator of rotation angle adding/subtracting type for producing an output rotation by adding or subtracting a rotation of motor 20 (or an angular input produced by the actuator), to or from a rotation angle of column shaft 4 (or a driver's angular input or steering input), and deliver the output rotation to pinion shaft 5 toward front wheels 2. A gear ratio controller 10 (which can serve as gear ratio controlling means) controls motor 20 by sending a command current to motor 20.

Figure 6:
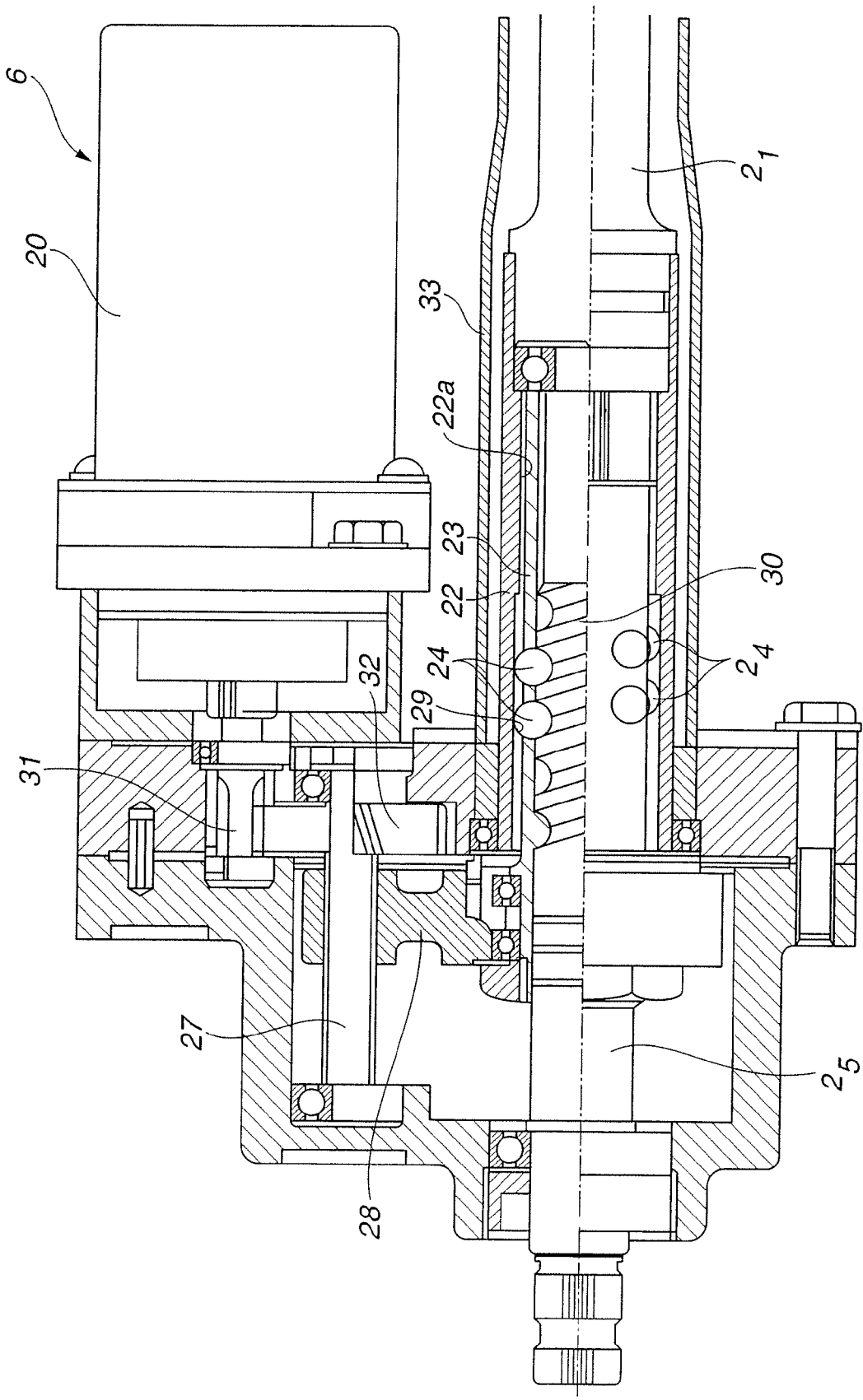
FIG. 6 is a sectional view showing the gear ratio varying actuator 6 employed in the preceding embodiments.
Figure 7A:
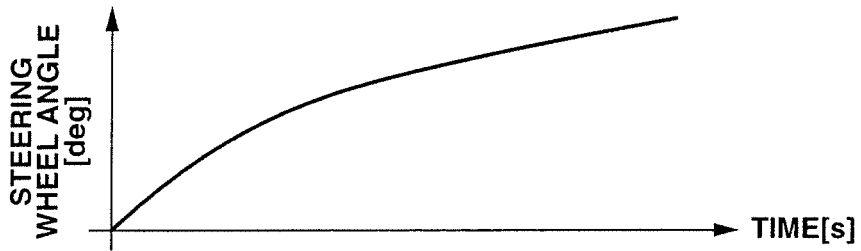
FIG. 7 (7A, 7B, 7C and 7D) is a time chart showing operating conditions in an angle increasing (adding) operation of the actuator.
Figure 7B:
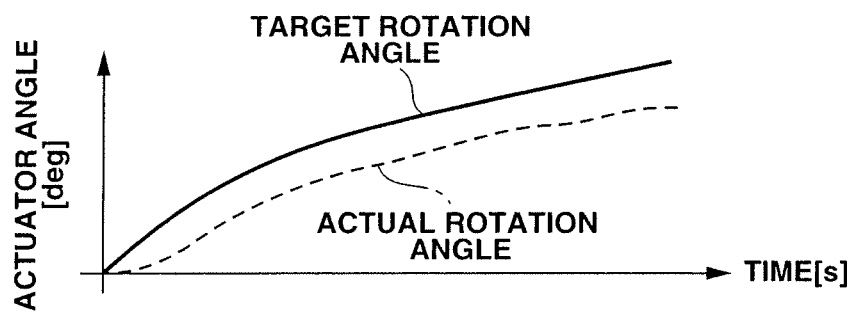
Figure 7C:
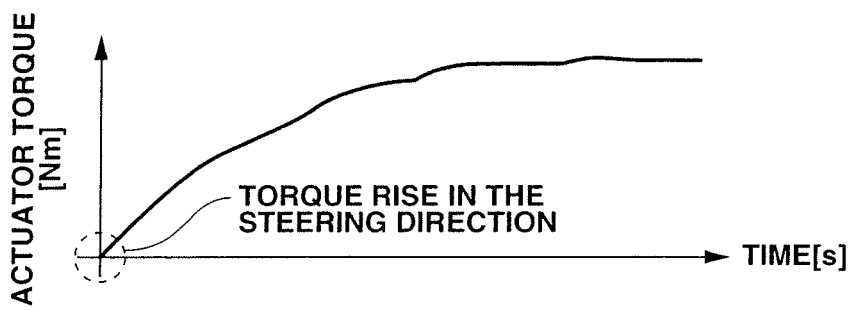
Figure 7D:
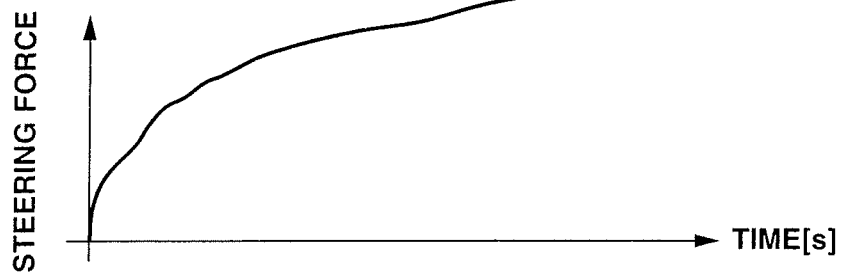

FIG. 6 shows, in section, gear ratio varying actuator 6 employed in this example. An input shaft 22 is fixed with an upper shaft 21 which is connected with column shaft 4. Input shaft 22 is a hollow shaft connected with upper shaft 21 end to end by forcibly fitting over upper shaft 21. Guide grooves or slots 22a are formed entire in the inside circumference of a forward portion of input shaft 22. An output shaft 25 is connected with pinion shaft 5. Output shaft 25 is received in input shaft 22 and arranged to rotate relative to input shaft 22. Output shaft 25 includes a ball screw groove 30 formed in the outside circumferential surface.

A slider 23 is disposed radially between input shaft 22 and output shaft 25 so that there is formed a small clearance between an inside circumferential surface of slider 23 and the outside circumferential surface of output shaft 25, and slider 23 is arranged to be movable axially. Slider 23 has a forward portion which is inserted in steering column 33 and which includes an outside circumferential surface formed with axially extending guide projections engaging with guide grooves 22a of input shaft 22 and thereby allowing axial movement of slider 23 relative to input shaft 22.

Slider 23 includes a plurality of ball retaining holes 29 for retaining a plurality of balls 24 so that each ball can roll. Each ball 24 is disposed between the hole 29 of slider 23 and ball screw groove 30 of output shaft 25 so that each ball 24 can roll therebetween.

Slider 23 is rotatably supported by a slider arm 28. Slider arm 28 is screwed over a lead screw shaft 27 so that slider arm 28 is movable axially. A helical gear 32 is fixed to one end of lead screw shaft 28. This helical gear 32 is engaged with a pinion 31 connected with the rotation shaft of motor 20.

The thus-constructed gear ratio varying actuator 6 is operated as follows: When motor 20 is not operated, an operation force inputted to steering wheel 1 is transmitted from upper shaft 21, through input shaft 22, slider 23 and balls 24, to output shaft 25. Therefore, in this state, the gear ratio varying actuator 6 transmits motion through pinion shaft 5 to front wheels 2 without producing a rotation angle difference between the input and output.

When motor 20 is operated, the lead screw shaft 27 is rotated in one direction, and therefore the slider arm 28 moves axially, and pushes balls 24 in one direction with the edges of the retaining holes 29 of slider 23. Therefore, balls 24 roll, move helically along the ball screw groove 30, and thereby impart rotational torque of a predetermined speed to output shaft 25. Output shaft 25, therefore, rotates in one direction through an angular displacement greater than the angular displacement of steering wheel 1, and steers the front wheels 2 through pinion shaft 5 through a greater steer angle. Gear ratio controller 10 can controls motor 20 by supplying a command current, and thereby achieve a desired gear ratio.

Gear ratio varying actuator 6 is not limited to the mechanism shown in FIG. 6. It is optional to employ various other actuators having different constructions, such as actuators of rotation angle adding and subtracting type, to receive an input rotation from a steering wheel and to deliver an output rotation toward a steerable wheel so that an output rotation angle is made greater or smaller than an input rotation angle.

Gear ratio controller 10 receives the steering wheel angle sensed by steering angle sensor 7, a motor rotation angle (actual rotation angle) sensed by motor rotation angle sensor 8, and a vehicle speed or a vehicle body speed sensed by a vehicle speed sensor 11.

In accordance with the signals supplied from the sensors, the gear ratio controller 10 calculates a value of the command current to achieve a desired gear ratio, and controls the gear ratio varying actuator 6. In this example, the desired gear ratio is made greater in a low vehicle speed region and made smaller in a high vehicle speed region to achieve both the turning performance in the low vehicle speed region and the vehicle stability in the high vehicle speed region.

Figure 2:
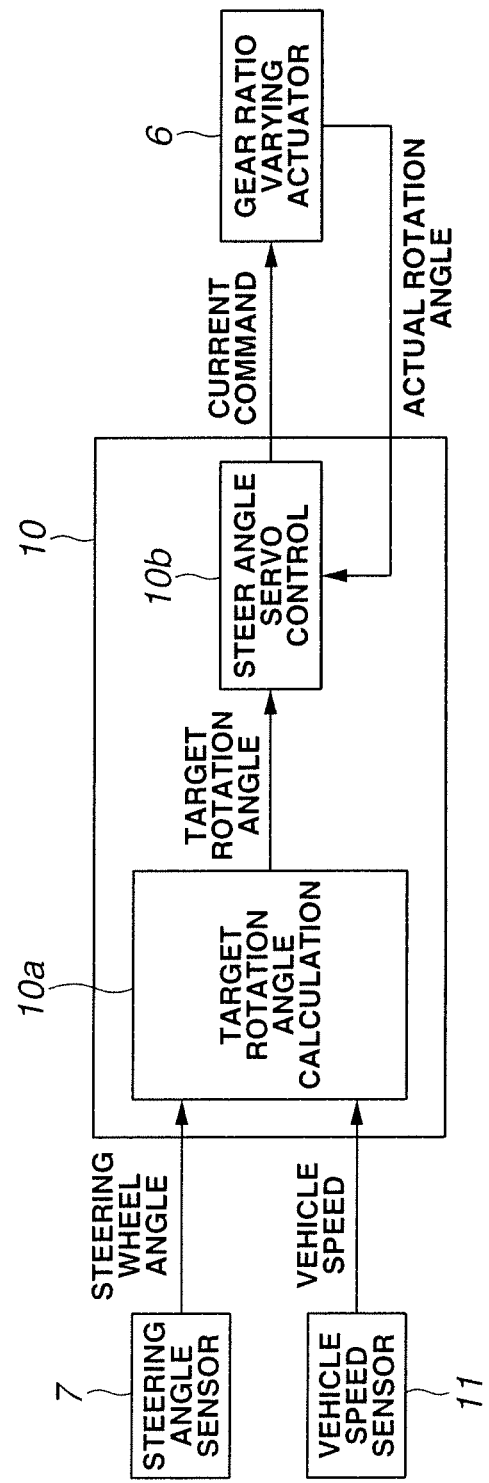
FIG. 2 is a block diagram showing a gear ratio controller 10 shown in FIG. 1.

FIG. 2 shows the gear ratio controller 10 of this example in the form of control block diagram. Gear ratio controller 10 includes a desired target rotation angle calculating section 10a and a steer angle servo control section 10b.

Desired target rotation angle calculating section 10a determines a desired target vehicle yaw rate in accordance with the steering wheel angle supplied from steering angle sensor 7 and the vehicle speed supplied from vehicle speed sensor 11, sets a desired target gear ratio to achieve the target yaw rate, and calculates a desired target rotation angle for gear ratio varying actuator 6, to achieve the target gear ratio.

Steer angle servo control section 10b controls the command current to gear ratio varying actuator 6 so as to reduce a deviation of the actual rotation angle of actuator 6 sensed by motor rotation angle sensor 8, from the target rotation angle determined by desired rotation angle calculating section 10a.

In this embodiment, the desired target gear ratio is set smaller than a mechanical gear ratio (on a slow side) in the high vehicle speed region, and, in the actuator angle decreasing operation or returning operation to drive the actuator 6 in a counter rotational direction opposite to the steering direction, the control system of this embodiment performs a gear ratio controlling process to set the gear ratio to a quick side once at a start of a steering operation from a position near the neutral steering position, and then to vary the gear ratio gradually to a value smaller than the mechanical gear ratio (on the slow side). The slow side is a side on which the gear ratio is smaller than the mechanical gear ratio, and the quick side is a side on which the gear ratio is greater than the mechanical gear ratio. The mechanical gear ratio is a gear ratio in an inoperative state in which gear ratio varying actuator 6 is inoperative and the column shaft 4 and pinion shaft 5 are rotated at a speed ratio of 1:1 (as a unit). The mechanical gear ratio is determined by specification data of steering mechanism 3.

The following is a process of calculating the command current employed in this example. Target rotation angle calculating section 10a first calculates vehicle parameters by using the following vehicle model.

In general, assuming a two-wheel vehicle model, it is possible to express the vehicle yaw rate and lateral acceleration by the following mathematical expression (1).

$$\begin{bmatrix} \varphi'' \\ V'y \end{bmatrix} = \begin{bmatrix} a_{11} & a_{12} \\ a_{21} & a_{22} \end{bmatrix} \begin{bmatrix} \varphi' \\ Vy \end{bmatrix} + \begin{bmatrix} b_{f1} \\ b_{f2} \end{bmatrix} \theta + \begin{bmatrix} b_{r1} \\ b_{r2} \end{bmatrix} \delta \quad (1)$$

$$a_{11} = \frac{-2(K_f L_f^2 + K_r L_r^2)}{I_z V_x}$$

$$a_{12} = \frac{-2(K_f L_f - K_r L_r)}{I_z V_x}$$

$$a_{21} = \frac{-2(K_f L_f - K_r L_r)}{M V_x} - V_x$$

$$a_{22} = \frac{-2(K_f + K_r)}{M V_x}$$

$$b_{f1} = \frac{2 K_f L_f}{I_z N}, \quad b_{f2} = \frac{2 K_f}{MN}$$

$$b_{r1} = \frac{-2 K_r L_r}{I_z}, \quad b_{r2} = \frac{2 K_r}{M}$$

In these equations, $\varphi'$=yaw rate ($\varphi$ is yaw angle, and the superscript sign ' indicates differentiation), Vy=lateral speed, $\theta$=front wheel steer angle, $\delta$=rear wheel steer angle, Iz=vehicle's inertia moment, M=vehicle weight, Lf=distance between the front axle and the center of gravity, Lr=distance between the center of gravity and the rear axle, N=gear ratio, Vx=longitudinal speed, Kf=front wheel cornering power, Kr=rear wheel cornering power, Cf=front wheel cornering force, Cr=rear wheel cornering force, and s=differential operator.

To obtain a transfer function of the yaw rate to the front wheel steer angle from the state equation, the following mathematical expression (2) is obtained.

$$\frac{\varphi'(s)}{\theta(s)} = \frac{H_f(s)}{G(s)} = \frac{b_{f1}s + (a_{12}b_{f2} - a_{22}b_{f1})}{G(s)} \quad (2)$$

In this equation, $G(s)=s^2-(a_{11}+a_{22})s+(a_{11}a_{22}-a_{12}a_{21})$.

From expression (2), the yaw rate transfer function is expressed by:

$$\varphi'(s) = \frac{\omega_{\varphi'}(V)_{\varphi'}^2(T(V)s + g_{\varphi'}(V))}{s^2 + 2\zeta_{\varphi'}(V)\omega_{\varphi'}(V)s + \omega_{\varphi'}(V)^2} \theta(s) \quad (3)$$

In this equation, $$g_{\varphi'}(V) = \frac{a_{12}b_{f2} - a_{22}b_{f1}}{a_{11}a_{22} - a_{12}a_{21}}$$

$$2\zeta_{\varphi'}(V)\omega_{\varphi'}(V) = -a_{11} - a_{22}$$

$$\omega_{\varphi'}(V)^2 = a_{11}a_{22} - a_{12}a_{21}$$

$$T_{\varphi'}(V) = \frac{b_{f1}}{a_{11}a_{22} - a_{12}a_{21}}$$

Thus, it is possible to determine the vehicle parameters $g_{\varphi'}(V)$, $\zeta_{\varphi'}(V)$, $\omega_{\varphi'}(V)$ and $T_{\varphi'}(V)$.

Then, target rotation angle calculating section 10a determines a desired target yaw rate $\phi'^*$ from the vehicle speed V, the vehicle parameters, and target parameters (mentioned later).

From mathematical expression (3), a desired target yaw acceleration $\phi''^*$ (asterisk indicates a target value) is obtained as follows:

$$\varphi''^*(s) = -2\zeta_{\varphi'^*}(V)\omega_{\varphi'^*}(V)\varphi'^*(s) + \quad (4)$$
$$\omega_{\varphi'^*}(V)^2 T_{\varphi'^*}(V)\theta(s) + \frac{1}{s}\omega_{\varphi'^*}(V)^2(g_{\varphi'^*}(V)\theta(s) - \varphi'^*(s))$$

The (target) parameters of target yaw rate $\phi'^*$ are given by the following equations.

$g\phi'^*(V)=g\phi''(V)\times\text{yrate\_gain\_map}$ $\omega\phi'^*(V)=\omega\phi'(V)\times\text{yrate\_omega\_map}$ $\zeta\phi'^*(V)=\zeta\phi'(V)\times\text{yrate\_zeta\_map}$ $T\phi'^*(V)=T\phi'(V)\times\text{yrate\_zero\_map}$ In these equations, yrate_gain_map, yrate_omega_map, yrate_zeta_map, yrate_zero_map are tuning parameters.

Therefore, the target yaw rate is given by:

$$\phi'^*(s)=\phi''^*(s)/s \quad (5)$$

The target front wheel steer angle $\theta^*$ is given by:

$$\phi''^*=a_{11}\phi'^*+a_{12}Vy+b_{f1}\theta^* \quad (6)$$

$$\theta^*=(\phi''^*-a_{11}\phi'^*-a_{12}Vy)/b_{f1} \quad (7)$$

Target rotation angle calculating section 10a calculates the target rotation angle $\theta_h$ of gear ratio varying actuator 6, required to achieve the target front wheel steer angle $\theta^*$.

Steer angle servo control section 10b calculates a deviation e of actual rotation angle $\theta_a$ of gear ratio varying actuator 6 from target rotation angle $\theta_h$ by using the following equation (8), and then calculates a current command $I_\theta$ from the deviation e, a proportional gain P, a derivative gain D and an integral gain I by using the following equation (9).

$$e=\theta_h-\theta_a \quad (8)$$

$$I_\theta=P\times e+P\times de/dt+I\times\int edt \quad (9)$$

The proportional gain P, derivative gain D and integral gain I are tuning constants.

Figure 3:
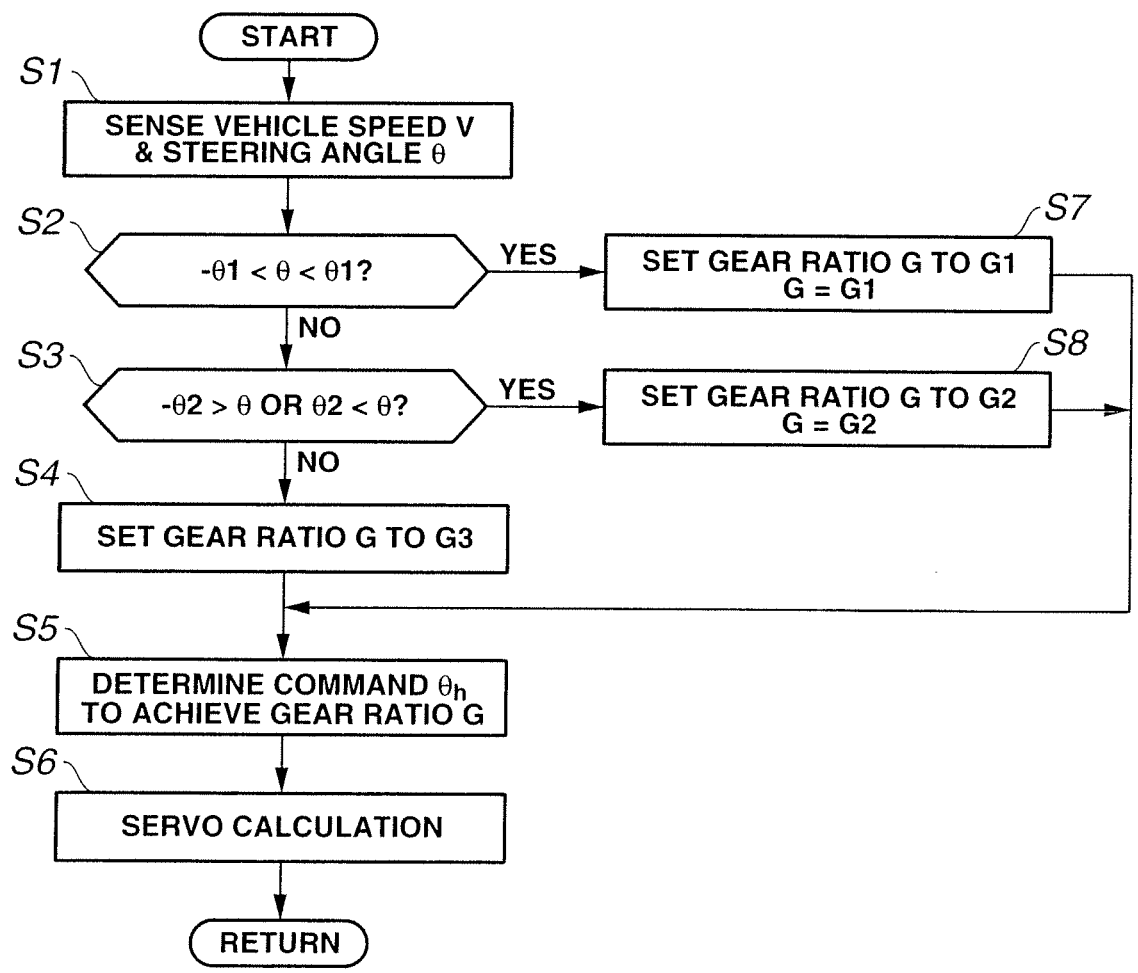
FIG. 3 is a flowchart showing a steering gear ratio control process performed by the controller according to the first embodiment in the case of an angle decreasing or subtracting (or returning) operation of a steering gear ratio varying actuator.

FIG. 3 shows a gear ratio control process according to the first embodiment in the form of a flowchart. Gear ratio controller 10 performs this control process in the case of the returning operation (or angle decreasing or subtracting operation) of gear ratio varying actuator 6.

At a step S1, controller 10 reads the steering wheel angle $\theta w$ sensed by steering angle sensor 7 and the vehicle speed (vehicle body speed) V sensed by vehicle speed sensor 11, for the target rotation angle calculation section 10a. After S1, controller 10 proceeds to a step S2.

At step S2, controller 10 examines whether the steering wheel 1 is in a neutral zone (at or near the neutral position) or not, by examining whether steering wheel angle $\theta w$ obtained at S1 is greater than a predetermined value $-\theta 1$ and at the same time the steering wheel angle $\theta w$ is smaller than a predetermined value $\theta 1(-\theta 1<\theta<\theta 1?)$, as a function of target rotation angle calculating section 10a. From S2, controller 10 proceeds to a step S7 when the answer of S2 is affirmative, and to a step S3 when the sensed steering wheel angle is not in the neutral zone (between $-\theta 1$ and $\theta 1$). In this example, step S2 examines whether the absolute value of steering wheel angle $\theta w$ is smaller than a (positive) predetermined first angle ($\theta 1$).

At step S3, controller 10 examines, as a function of target rotation angle calculating section 10a, whether the steering wheel is operated beyond an adjacent zone or not. The adjacent zone is a zone to vary the gear ratio gradually. In this example, controller 10 examines whether the sensed steering wheel angle $\theta w$ is smaller than a predetermined value $-\theta 2$ or the steering wheel angle $\theta w$ is greater than a predetermined value $\theta 2$. From S3, controller 10 proceeds to a step S8 when the answer of S3 is affirmative, and to a step S4 when the steering wheel angle is still within the adjacent zone (between $-\theta 2$ and $\theta 2$, outside the neutral zone). In this example, step S3 examines whether the absolute value of steering wheel angle $\theta w$ is greater than a (positive) predetermined second angle ($\theta 2$) greater than the predetermined first angle ($\theta 1$).

Figure 9:
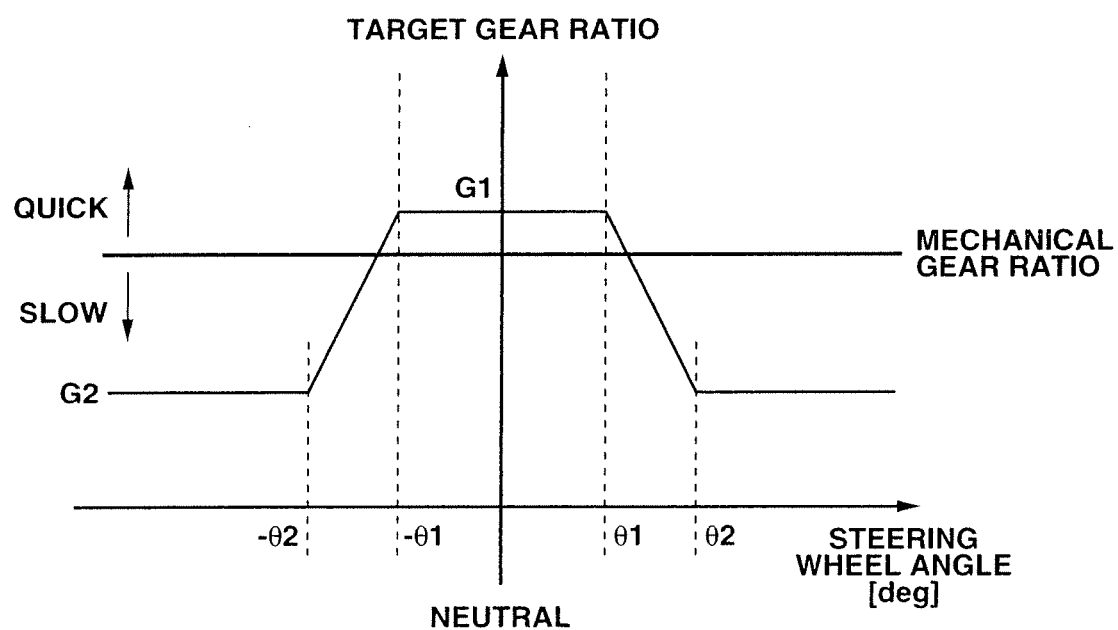
FIG. 9 is a graph showing a steering gear ratio variation in the gear ratio control according to the first embodiment.

At step S4, controller 10 sets the target gear ratio G to a ratio value G3 which is intermediate between ratio values G1 and G2, as a function of target rotation angle calculating section 10a, and then proceeds to a step S5. In this case, controller 10 determines the gear ratio so as prevent a variation of the gear ratio with respect to the steering wheel angle from causing unnatural feeling to the driver, by using, for example, technique of liner interpolation between G1 and G2 and $\theta 1$ and $\theta 2$. Thereafter, the gear ratio G is set finally to the ratio value G3 (G=G3). The first ratio value G1 is greater than the mechanical gear ratio whereas the second ratio value G2 is smaller than the mechanical gear ratio (as shown in FIG. 9). Gear ratio value G3 is a value derived from G1 and G2.

At step S5, controller 10 calculates the target rotation angle $\theta h$ from the target gear ratio G determined at S4, S7 or S8, as a function of target rotation angle calculating section 10a, and then proceeds to a step S6. Thus, at S5, controller 10 determines the command $\theta h$ to achieve target gear ratio G.

At step S6, controller 10 performs a servo control operation to reduce the deviation between the actual rotation angle $\theta a$ sensed by rotation angle sensor 8 and the target rotation angle θh determined at S5, as a function of servo control section 10b, and then proceeds to an end (RETURN) of the process of FIG. 3.

At step S7, controller 10 sets target gear ratio G to the first ratio value G1 on the quick side of the mechanical gear ratio, and then proceeds to step S5. At step S8, controller 10 sets target gear ratio G to the second ratio value G2 on the slow side of the mechanical gear ratio, and then proceeds to step S5.

The thus-constructed steering control system is operated as follows: In the steering control system of the before-mentioned Japanese patent document JP2005-170129, there is provided, in a linkage between a steering wheel and front wheels, a gear ratio varying or variable gear ratio actuator having a coaxial motor for varying the steering gear ratio by adding or subtracting a rotation angle to or from the steering wheel angle inputted through the steering wheel. This control system increases a steering stiffness or rigidity by increasing a servo gain in the vicinity of the steering neutral position.

This gear ratio varying actuator outputs a torque in accordance with a product obtained by multiplying the deviation between the target rotation angle and actual rotation angle, by the servo gain. However, in a small steering wheel angle zone at or near the steering neutral position, the target rotation angle is small, and the deviation of the actual rotation angle from the target rotation angle tends to be so small as to make it difficult to produce an actuator torque. Accordingly, the actuator torque tends to yield to a steering reaction force which is a load applied from the road surface, and the gear ratio varying actuator tends to be somewhat poor in following up performance or response.

Therefore, the control system of the above-mentioned Japanese patent document is arranged to increase the servo gain in the case of a steering operation within the vicinity of the neutral position, and thereby produces a greater steering torque even if the deviation is very small, thereby to cause the actual rotation angle to faithfully follow the target rotation angle. By increasing the actuator torque with a greater servo gain, the system can improve the response of the gear ratio varying actuator and improve a feeling of steering stiffness near the steering neutral position.

In this system, however, the gear ratio varying actuator is arranged to produce an actuator torque in a direction to reduce the deviation between the actual rotation angle and the target rotation angle. Therefore, in the case of an actuator's returning operation of decreasing the gear ratio below the mechanical gear ratio, the actuator torque acts in the direction opposite to the steering direction at the beginning of a steering operation from the neutral position, and tends to cause undesired letdown or decrease of the steering reaction.

Figure 4:
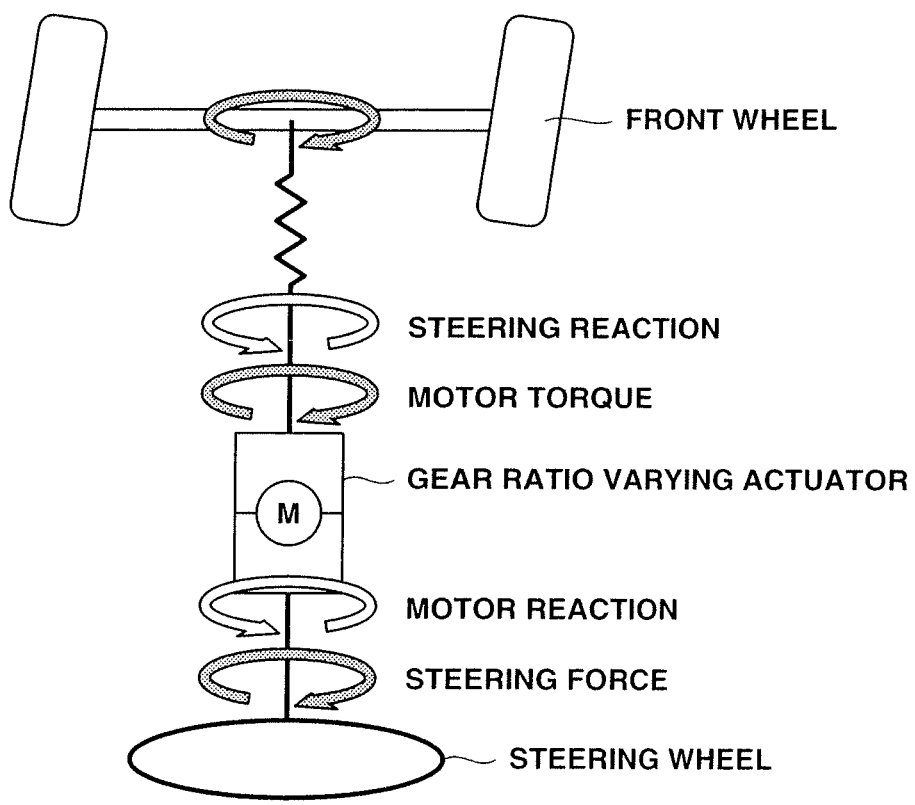
FIGS. 4 and 5 are schematic views for illustrating a basic concept of the present invention.
Figure 5:
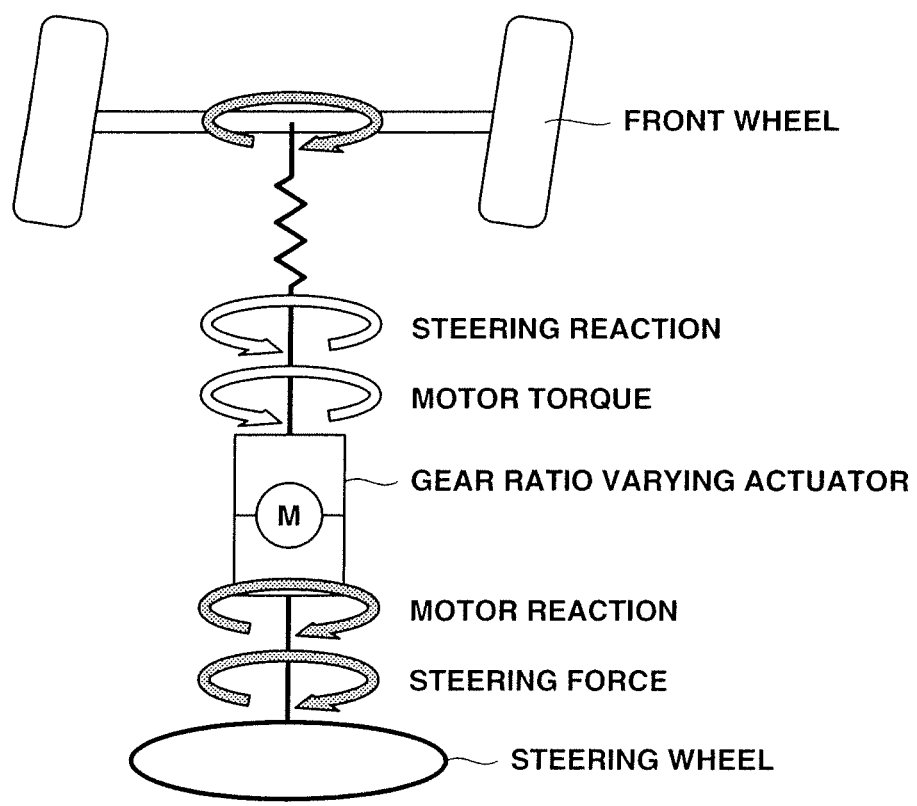

The steering reaction is let down or decreased in the following manner. When, as shown in FIG. 4, the direction of the motor torque (actuator torque) is the same as the direction of the steering force (the steering direction), the motor reaction (actuator reaction) acts in the direction opposite to the steering force, and thereby provides a feeling of sufficient response or resistance to the driver. When, on the other hand, as shown in FIG. 5, the motor torque and the steering force act in the opposite directions, the motor reaction acts in the same direction as the steering force, and thereby decreases the response or resistance to the driver. When the motor torque is produced in the opposite direction to the steering direction at the start of a steering operation from the steering neutral position, the gear ratio varying actuator may provide the driver a feeling of letdown or loss of the response or the steering reaction.

In the variable gear ratio control, in general, the gear ratio is set to the quick side (an angle increase or addition by the actuator) by addition of the actuator rotation angle to the steering angle in a low and medium vehicle speed region. In a high vehicle speed region, the gear ratio is set to the slow side (an angle decrease or subtraction by the actuator) by subtraction of the actuator rotation angle from the steering wheel angle.

In the situation of the actuator's angle increase operation to set the gear ratio to the quick side, the control system determines, by calculation, the target rotation angle to drive the gear ratio varying actuator in the same direction as the steering direction. Therefore, the actuator torque is produced in the same direction as the steering direction, as shown in FIGS. 7A~7D. From the start of a steering operation, the actuator torque rises in the steering direction.

In the situation of the actuator's angle decrease or subtracting operation to set the gear ratio to the slow side, however, the actuator torque behaves in a different manner as shown in FIGS. 8A~8D. Because of an internal gear friction inside the gear ratio varying actuator, the gear ratio varying actuator is rotated in the steering direction together by the gear friction at the start of the steering operation.

Thereafter, the actuator torque of the gear ratio varying actuator starts following the target rotation angle with a delay. In this case, the direction of the actuator torque is dependent on the direction of the deviation of the actual rotation angle from the target rotation angle, and the torque is produced in the direction to reduce the deviation. As a result, the actuator torque is produced initially in the opposite direction to the steering direction. Thus, the rotation of the actuator is delayed, as shown in FIG. 8B, because a force is transmitted by the gear friction within the actuator at the initial stage of the steering operation. The torque is generated in the direction opposite to the direction of the steering force (steering direction) due to the delay in the rotation, as shown in FIG. 8C. Consequently, the steering force could be decreased temporarily, as a letdown in force, as shown in FIG. 8D.

Because the direction of the actuator torque is determined by the direction of the deviation, the system merely arranged to increase the servo gain near the steering neutral position as disclosed in the before-mentioned Japanese patent document JP2005-170129 is unable to avoid the opposition between the direction of the actuator torque and the steering direction, and accordingly unable to prevent undesired initial letdown of the steering reaction.

By contrast, the vehicle steering control system according to the first embodiment prevents the letdown of the steering reaction at the initial stage of a steering operation in the following manner. As shown in FIG. 9, for improvement against the initial letdown of the steering reaction at the initial stage of the steering operation, the gear ratio G is set to the quick side (G1) only in the neutral zone ($-\theta1<\theta<\theta1$) (S1→S2→S7→S5→S6).

When steering wheel 1 is turned from a position near the neutral position, therefore, the control system can increase the actuator torque in the steering direction from the start of the steering operation, and thereby prevent undesired letdown of the steering reaction, as shown in FIGS. 10A~10D.

Then, as the steering wheel angle (the absolute value of the steering wheel angle) increases beyond the neutral zone ($-\theta1<\theta<\theta1$), the control system varies the gear ratio G to the slow side in such a gradual manner as to prevent an unnatural feeling to the driver (S1→S2→S3→S4→S5→S6).

When the steering wheel angle (the absolute value of the steering wheel angle) is further increased ($-\theta2>\theta$ or $\theta2<\theta$), the control system sets the gear ratio G to the slow side (G2)

(S1→S2→S3→S8→S5→S6). If the gear ratio is held on the quick side even in a larger steering wheel angle region, there arises a possibility that the yawing response is held high, the vehicle yaw rate is produced beyond the target yaw rate, and the vehicle stability is degraded. Therefore, when the steering wheel angle increases to some degree, the steering control system of this embodiment decreases the yawing response, and improve the stability by varying the steering gear ratio G to the slow side corresponding to the target yaw rate.

The steering control system according to this embodiment performs the operation to produce the actuator torque in the steering direction only in the case of the angle decreasing or returning actuator operation of gear ratio varying actuator 6. If gear ratio G is adjusted to the quick side in the angle increasing actuator operation, there is a possibility that the yawing response becomes too high, and the vehicle behavior become unstable. Therefore, the steering control system of this embodiment improves the stability of the yawing response by holding the gear ratio G unchanged at the time of the angle increasing actuator operation.

The first embodiment can provide the following effects at least.

(1) First, gear ratio controller 10 produces an actuator torque of gear ratio varying actuator 6 in the direction identical to the steering direction at an initial stage of a driver's steering operation. Therefore, the control system according to the first embodiment can prevent underside letdown of the steering reaction by matching the direction of the actuator torque to the steering direction in response to the driver's steering operation.

(2) Second, gear ratio controller 10 produces an actuator torque in the same direction as the steering direction at the start of the steering operation in the neutral zone or small steering angle zone where the absolute value of the steering wheel angle θw is small (smaller than predetermined value θ1). Therefore, the control system of the first embodiment can prevent undesired letdown of the steering reaction, without exerting undesired influence on the vehicle behavior or target vehicle behavior (such as yaw rate or target yaw rate), at the initial stage of the steering operation.

(3) Gear ratio controller 10 produces an actuator torque in the same direction as the steering direction only when the actuator varies the gear ratio by subtracting a rotation angle from the steering input. Therefore, the control system of the first embodiment can prevent undesired letdown of the steering reaction without exerting undesired influence on the vehicle behavior or target vehicle behavior (such as yaw rate or target yaw rate) at the initial stage of the steering operation.

(4) Gear ratio controller 10 produces an actuator torque in the same direction as the steering direction by adding an actuator's rotation angle or an actuator's angular input, to the driver's steering angular input. Therefore, the control system can hold the deviation e of the actual rotation angle $\theta_a$ of the actuator from the target rotation angle $\theta_h$ always positive, and thereby matches the direction of the actuator torque to the steering direction.

In a vehicle steering control system according to a second embodiment of the present invention, the control system directs the actuator torque in the same direction as the steering direction, by an offsetting operation to add a modification angle corresponding to the gear ratio, to the target rotation angle $\theta_h$. The steering control system of the second embodiment is substantially identical in construction to the control system shown in FIGS. 1 and 2, so that repetitive explanation is omitted.

While the gear ratio G is varied in accordance with the steering wheel angle $\theta_w$ in the first embodiment, the target rotation angle $\theta_h$ is increased or offset by addition of the modification angle corresponding to a variation of the gear ratio. With this offsetting operation, the control system performs the steer angle increasing actuator operation as in the first embodiment at the initial stage of the steering operation from the neutral position.

Figure 10A:
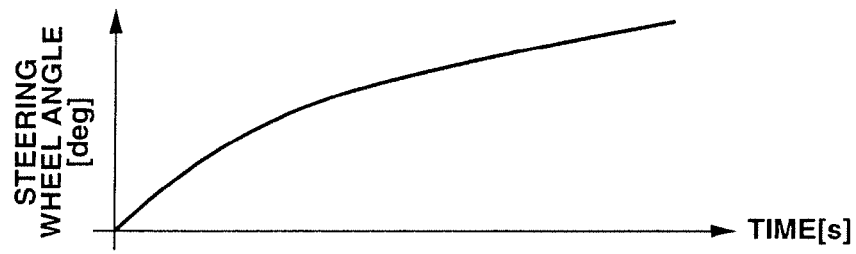
FIG. 10 (10A, 10B, 10C and 10D) is a time chart showing the operating conditions in the gear ratio control according to the first embodiment (and a second embodiment).
Figure 10B:
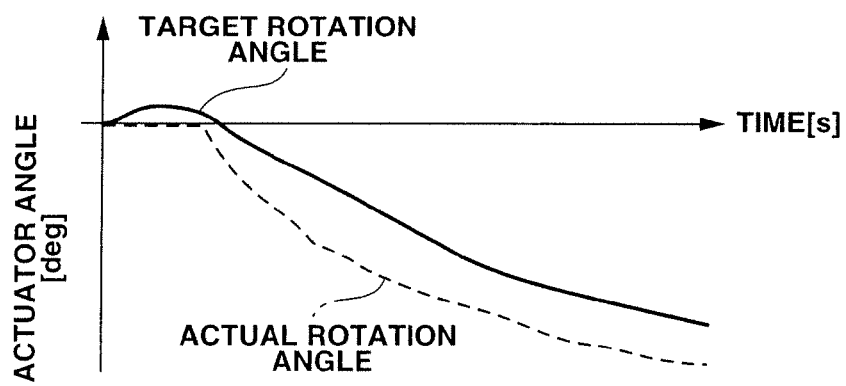
Figure 10C:
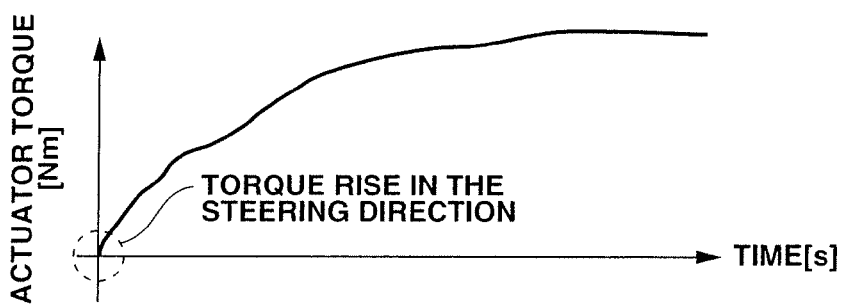
Figure 10D:
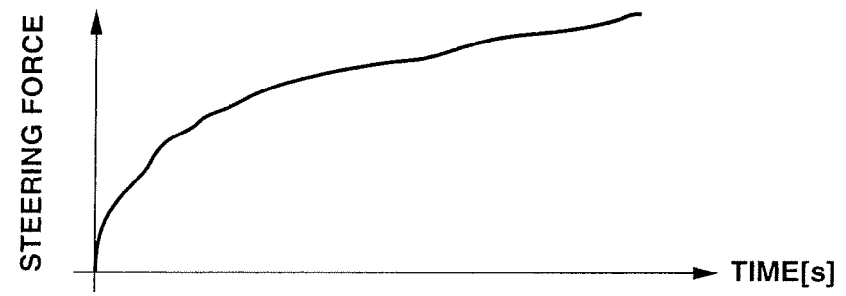

Therefore, in the control system of the second embodiment, the target rotation angle $\theta_h$ rises in the steering direction as shown in FIG. 10B when the steering wheel is turned from the neutral position, and the deviation between the actual rotation angle $\theta_a$ and target rotation angle $\theta_h$ is held positive invariably. Thus, the control system of the second embodiment can match the direction of the actuator torque to the steering direction.

The second embodiment can provide the following effect in addition to the first, second and third effects (1)~(3) of the first embodiment.

Gear ratio controller 10 according to the second embodiment modifies the target rotation angle $\theta_h$ of gear ratio varying actuator 6 in the vicinity of the neutral position (or in the neutral zone of −θ1<θ<θ1) so that target rotation angle $\theta_h$ rises initially in the same direction as the steering direction. Therefore, the control system of the second embodiment can hold the deviation e of the actual rotation angle $\theta_a$ of the actuator from the target rotation angle $\theta_h$ always positive, and thereby match the direction of the actuator torque to the steering direction.

Figure 11:
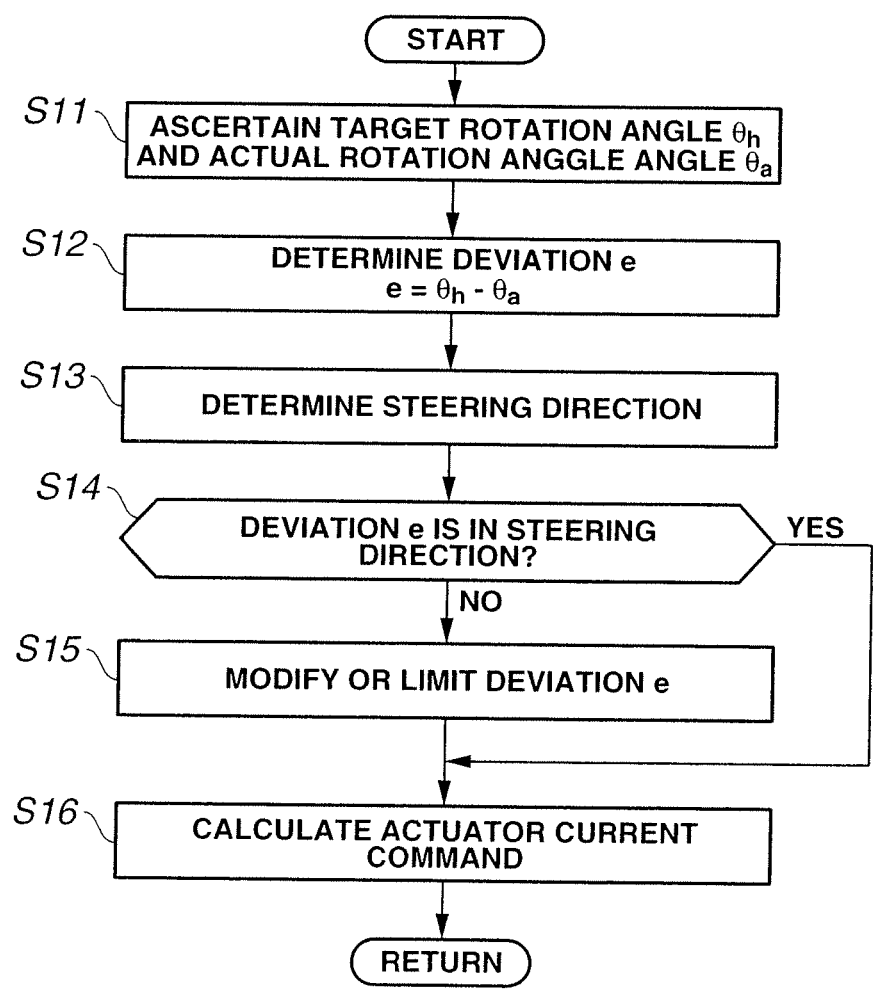
FIG. 11 is a flowchart showing a steering gear ratio control process performed by the controller according to a third embodiment of the present invention.
Figure 12A:
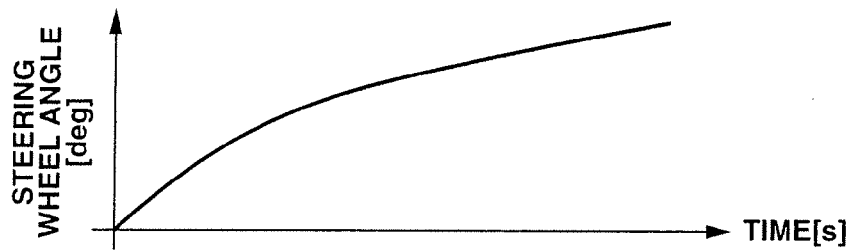
FIG. 12 (12A, 12B, 12C and 12D) is a time chart showing the operating conditions in the gear ratio control according to the third embodiment.
Figure 12B:
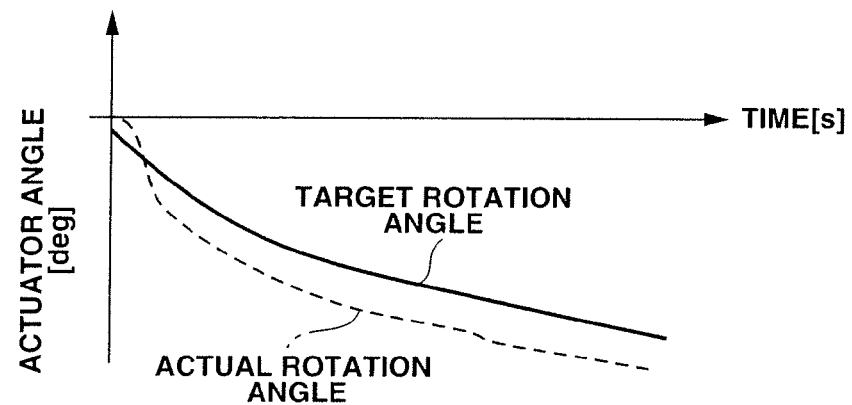
Figure 12C:
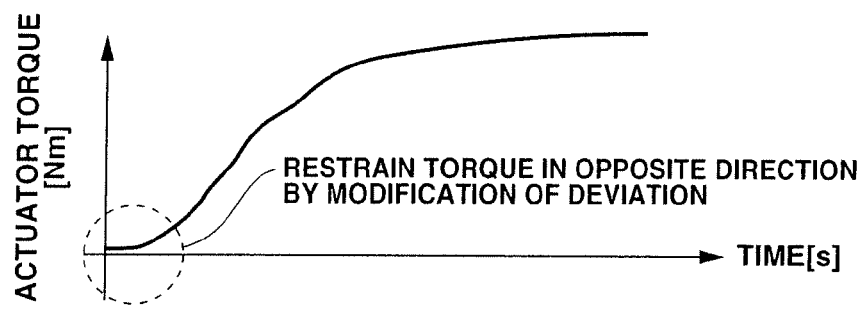
Figure 12D:
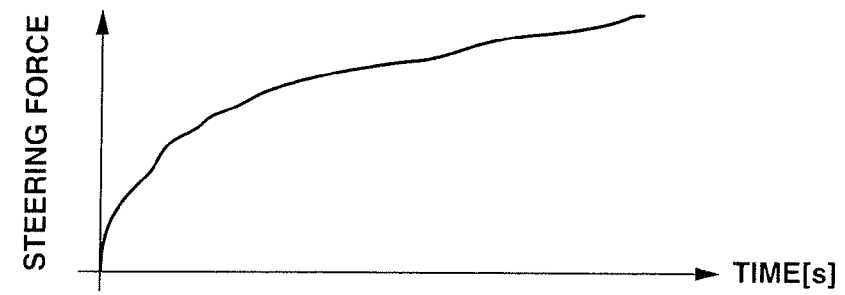

FIG. 11 is a view for illustrating a steering control system according to a third embodiment. In the third embodiment, the control system is arranged to match the direction of the actuator torque to the steering direction by modifying the deviation of actual rotation angle $\theta_a$ from target rotation angle $\theta_h$. The steering control system of the third embodiment is substantially identical in construction to the control system shown in FIGS. 1 and 2; so that repetitive explanation is omitted. The gear ratio controller 10 according to the third embodiment performs a gear ratio control process shown in FIG. 11

At a step S11, controller 10 ascertains the target rotation angle $\theta_h$ and actual rotation angle $\theta_a$ as a function of steer angle servo control section 10b, and then proceeds to a next step S12. At step S12, controller 10 calculates the deviation e from target rotation angle $\theta_h$ and actual rotation angle θa according to the equation (8)(e=$\theta_h$−$\theta_a$), and then proceeds to a step S13.

At step S13, controller 10 detects the steering direction, and then proceeds to a step S14. It is possible to detect the steering direction by checking the direction of a produced steering torque, or the direction of a steering angular speed, for example.

At step S14, controller 10 examines whether the direction of the deviation e is in agreement with the steering direction determined at S13, or not. From S14, controller 10 proceeds to a step S16 when the direction of the deviation e is identical to the steering direction, and proceeds to a step S15 when the direction of the deviation e is opposite to the steering direction.

At step S15, controller 10 modifies the deviation e toward a region in which the direction of the deviation is the same as the steering direction. Then, controller 10 proceeds from S15 to step S16.

At step S16, controller 10 calculates the current command $I_\theta$ according to the equation (9) from the deviation e determined at S12 or modified at S15, and then terminates the process of FIG. 11.

The thus-constructed steering control system of the third embodiment modifies the value of deviation e of actual rotation angle ($\theta_a$) from target rotation angle ($\theta_h$), so as to change the direction of the deviation e toward the steering direction, if the direction of the deviation is opposite to the steering direction, to prevent an actuator torque from being produced in the opposite direction to the steering direction at the start of a steering operation from the steering neutral position, by taking the course of S11→S2→S13→S14→S15→S16. By so doing, the control system can prevent the actuator torque from being produced in the opposite direction to the steering direction, and thereby prevent undesired decrease or letdown of the steering reaction at the initial stage of a steering operation, as shown in FIGS. 12A, 12B, 12C and 12D.

The third embodiment can provide the following effect in addition to the first, second and third effects (1)~(3) of the first embodiment. 1

Gear ratio controller 10 modifies the control deviation e of gear ratio varying actuator 6 in response to a driver's steering operation from the neutral position, so as to produce an actuator torque in the same direction as the steering direction. Therefore, the control system of the third embodiment can restrain the direction of the actuator torque from becoming opposite to the steering direction, and thereby prevent undesired decrease or letdown of the steering reaction.

The present invention is not limited to the first, second and third embodiments. Various variations and modifications are possible within the purview of the present invention. For example, instead of sensing the actual rotation angle of gear ratio varying actuator 6 with the motor rotation sensor 8, it is possible to employ an arrangement to sense an actual front wheel steer angle, for example, from the rotation angle of the pinion shaft, and to calculate the actual rotation angle of the gear ratio varying actuator from the actual front wheel steer angle.

According to the first, second and third embodiments, a vehicle steering control apparatus comprises: an actuator to vary a steering gear ratio of a wheel steer angle of a vehicle to a steering wheel angle; and a controller to control the actuator so as to reduce a deviation of an actual rotation angle of the actuator from a target rotation angle to achieve a desired target steering gear ratio, and to modify the deviation so as to prevent a torque from being produced by the actuator in an opposite direction opposite to a steering direction at the start of a driver's steering operation. The controller may be configured to modify the deviation so as to prevent a torque from being produced by the actuator in the opposite direction opposite to the steering direction only when (the absolute value of) the steering wheel angle is smaller than a predetermined angle (such as $\theta 2$ or $\theta 1$). The steering control apparatus may further comprise a vehicle condition sensor (such as sensor 7 and/or sensor 11) to sense a vehicle operating condition; and the controller may be configured to determine the target rotation angle in accordance with the vehicle operating condition.

According to the first, second and third embodiments, a vehicle steering control method comprises: producing a control signal to control an actuator to vary a steering gear ratio of a vehicle wheel steer angle to a steering wheel angle; and modifying the control signal so as to prevent a torque from being produced by the actuator in an opposite direction opposite to a steering direction at the start of a driver's steering operation. The method element of producing the control signal to control the actuator for varying the steering gear ratio may comprise (i) determining a target rotation angle of the actuator in accordance with a vehicle operating condition, (ii) determining a deviation of an actual rotation angle of the actuator from the target rotation angle, and (iii) producing the control signal in a feedback control mode to reduce the deviation; and the method element of modifying the control signal may comprise modifying the deviation so as to prevent a torque from being produced by the actuator in the opposite direction opposite to the steering direction at the start of a driver's steering operation.

According to one aspect of the present invention, a vehicle steering control apparatus comprises: means for controlling an actuator to vary a steering gear ratio of a vehicle wheel steer angle to a steering wheel angle by producing a control signal; and means for modifying the control signal so as to prevent a torque from being produced by the actuator in an opposite direction opposite to a steering direction at the start of a driver's steering operation. The controlling means may comprise means for determining a target rotation angle of the actuator in accordance with a vehicle operating condition, means for determining a deviation of an actual rotation angle of the actuator from the target rotation angle, and means for producing the control signal in a feedback control mode to reduce the deviation; and the modifying means may comprise means for modifying the deviation so as to prevent a torque from being produced by the actuator in the opposite direction opposite to the steering direction at the start of a driver's steering operation.

This application is based on a prior Japanese Patent Application No. 2007-201478 filed on Aug. 2, 2007. The entire contents of this Japanese Patent Application No. 2007-201478 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle steering control apparatus comprising:
   an actuator configured to vary a steering gear ratio of a vehicle wheel steer angle of a steerable wheel to a steering wheel angle by adding an angular input of the actuator to an angular input from a steering wheel or subtracting the angular input of the actuator from the angular input from the steering wheel; and
   a controller configured to control the actuator to produce an actuator torque in a steering direction at a start of a driver's steering operation;
   wherein the controller is configured to produce the actuator torque in the steering direction with the actuator in a case of a steering angle decreasing actuator operation, in which the actuator is operated to subtract a rotation angle produced by the actuator from a driver's steering input;
   wherein the controller is configured to perform a control operation to control the actuator to produce the actuator torque in a direction to reduce a deviation of an actual rotation angle of the actuator from a target rotation angle; and
   wherein the controller is further configured to modify the deviation to prevent the actuator torque from being produced in an opposite direction opposite to the steering direction, by the control operation for reducing the deviation caused by a delay of the actual rotation angle with respect to the target rotation angle, which is due to internal friction in the actuator at the start of the driver's steering operation in the case of the steering angle decreasing actuator operation.

2. The vehicle steering control apparatus as claimed in claim 1, wherein the controller is configured to produce the actuator torque in the steering direction with the actuator when a steering angle is within a small angle zone.

3. The vehicle steering control apparatus as claimed in claim 1, wherein the controller is configured to produce the actuator torque in the steering direction by controlling the actuator to add a rotation angle to the driver's steering input.

4. The vehicle steering control apparatus as claimed in claim 1, wherein the controller is configured to modify a target gear ratio for the actuator so that the target gear ratio is increased in a vicinity of a steering neutral position.

5. The vehicle steering control apparatus as claimed in claim 1, wherein the controller is configured to modify the target rotation angle for the actuator so that the target rotation angle rises in the steering direction in a vicinity of a steering neutral position.

6. The vehicle steering control apparatus as claimed in claim 1, wherein the controller is configured to modify the deviation of the actuator to produce the actuator torque in the steering direction when a steering wheel is turned away from a steering neutral position.

7. The vehicle steering control apparatus as claimed in claim 1, wherein the actuator is provided in a mechanical steering linkage so that rotation is transmitted through the actuator from the steering wheel toward the steerable wheel of the vehicle, and the controller is configured to control the actuator to produce the actuator torque in a steering direction when a driver starts turning the steering wheel.

8. The vehicle steering control apparatus as claimed in claim 1, wherein the controller is configured to control the actuator in a direction to produce the actuator torque in the steering direction temporarily at the start of the driver's steering operation so as to prevent a temporary initial decrease of a steering reaction, and then to control the actuator in a direction to subtract a rotation angle of the actuator torque from the driver's steering input when a steering angle increases.

9. The vehicle steering control apparatus as claimed in claim 1, wherein the controller is configured to modify the deviation to hold the deviation positive invariably to match the direction of the actuator torque to the steering direction.

10. The vehicle steering control apparatus as claimed in claim 1, wherein the controller is configured to modify the deviation so as to change the direction of the deviation toward the steering direction to prevent an actuator torque from being produced in the opposite direction to the steering direction.

11. A vehicle steering control apparatus comprising:
an actuator provided in a mechanical steering linkage and arranged to vary a steering gear ratio of a wheel steer angle of a vehicle to a steering wheel angle; and
a controller to control the actuator so as to reduce a deviation of an actual rotation angle of the actuator from a target rotation angle to achieve a desired target steering gear ratio, and to modify the deviation so as to prevent a torque from being produced by the actuator in an opposite direction opposite to a steering direction at the start of a driver's steering operation;
wherein the controller is configured:
to determine the target rotation angle in one of (1) an adding direction to add a rotation an le of the actuator to a driver's steering input and (2)a subtracting direction to subtract the rotation angle of the actuator from the driver's steering input, in accordance with a vehicle operating condition, and
to modify the deviation so as to prevent the deviation from being varied in a direction to produce an actuator torque in the opposite direction, by a delay of a rise of the actual rotation angle in the subtracting direction with respect to a rise of the target rotation angle in the subtracting direction, which is due to internal friction in the actuator acting to rotate the actuator in the steering direction.

12. The vehicle steering control apparatus as claimed in claim 11, wherein the actuator is arranged to vary the steering gear ratio to a quick side in an addition mode to add the rotation angle produced by the actuator to a driver's steering input and to vary the steering gear ratio to a slow side in a subtraction mode to subtract the rotation angle of the actuator from the steering input, and the controller is configured to modify the deviation at the start of the driver's steering operation only when the actuator is controlled in the subtraction mode.

13. The vehicle steering control apparatus as claimed in claim 11, wherein the controller is configured to modify the deviation so as to prevent a torque from being produced by the actuator in the opposite direction opposite to the steering direction when the steering angle is smaller than a predetermined angle.

14. The vehicle steering control apparatus as claimed in claim 11, wherein the controller is configured to modify the deviation so as to prevent the deviation from becoming negative.

15. The vehicle steering control apparatus as claimed in claim 11, wherein the controller is configured to modify the deviation by modifying the target steering gear ratio.

16. The vehicle steering control apparatus as claimed in claim 15, wherein the controller is configured to set the target steering gear ratio to a higher ratio value when the steering angle is smaller than a predetermined first angle and to set the target steering gear ratio to a lower ratio value lower than the higher ratio value when the steering angle is greater than a second angle greater than the first angle.

17. The vehicle steering control apparatus as claimed in claim 16, wherein the controller is configured to vary the target steering gear ratio gradually from the higher ratio value to the lower ratio value as the steering angle is increased from the first angle to the second angle.

18. The vehicle steering control apparatus as claimed in claim 15, wherein the controller is configured to set the target steering gear ratio to a higher ratio value which is higher than a mechanical gear ratio when the steering angle is smaller than the predetermined first angle and to set the target steering gear ratio to a lower ratio value which is lower than the mechanical gear ratio when the steering angle is greater than the second angle greater than the first angle.

19. The vehicle steering control apparatus as claimed in claim 11, wherein the controller is configured to modify the deviation by modifying the target rotation angle.

20. The vehicle steering control apparatus as claimed in claim 11, wherein the controller is configured to control the actuator in the steering direction or in the opposite direction in dependence on a direction of the deviation, and to modify the deviation as to prevent a torque from being produced by the actuator in the opposite direction opposite to the steering direction when the direction of the deviation is opposite to the steering direction.

21. The steering control apparatus as claimed in claim 11, wherein the steering control apparatus further comprises a rotation angle sensor to sense the actual rotation angle of the actuator, and a vehicle condition sensor to sense a vehicle operating condition; and the controller is configured to determine the target rotation angle in accordance with the vehicle operating condition sensed by the vehicle condition sensor, and to determine the deviation of the actual rotation angle sensed by the rotation angle sensor from the target rotation angle.

22. A vehicle steering control method comprising:
- producing a control signal using a controller, to control an actuator to vary a steering gear ratio of a vehicle wheel steer angle of a steerable wheel to a steering wheel angle; and
- modifying the control signal using the controller, so as to prevent a torque from being produced by the actuator in an opposite direction opposite to a steering direction at a start of a driver's steering operation;
- wherein the actuator is controlled to reduce a deviation of an actual rotation angle of the actuator from a target rotation angle, and
- wherein the deviation is modified using the controller, to prevent the deviation from being varied in a direction to produce an actuator torque in the opposite direction opposite to the steering direction, by a delay of the actual rotation angle with respect to the target rotation angle due to internal friction in the actuator acting to rotate the actuator in the steering direction at the start of the driver's steering operation.

* * * * *